United States Patent [19]

Berrill

[11] Patent Number: 5,565,687
[45] Date of Patent: Oct. 15, 1996

[54] LIQUID LEVEL MONITOR HAVING A PLURALITY OF PROXIMITY SENSORS AND A SENSOR ACTUATING ELEMENT

[75] Inventor: Michael J. Berrill, Caithness, Scotland

[73] Assignee: Rolls-Royce and Associates Limited, Derby, England

[21] Appl. No.: 318,836

[22] PCT Filed: Sep. 2, 1992

[86] PCT No.: PCT/GB92/01601

§ 371 Date: Oct. 18, 1994

§ 102(e) Date: Oct. 18, 1994

[87] PCT Pub. No.: WO93/22623

PCT Pub. Date: Nov. 11, 1993

[30] Foreign Application Priority Data

Apr. 23, 1992 [GB] United Kingdom ............. 9208749

[51] Int. Cl.$^6$ ..................................... G01N 15/06
[52] U.S. Cl. ................. 250/577; 73/314; 340/623
[58] Field of Search ....................... 250/577, 208.4, 250/222.1, 221, 214.1, 214 SW, 559.4; 340/619–624; 324/149, 220; 73/313, 314, DIG. 3, DIG. 5

[56] References Cited

U.S. PATENT DOCUMENTS

| | | |
|---|---|---|
| 3,895,223 | 7/1975 | Neuner et al. . |
| 3,906,469 | 9/1975 | Kronk . |
| 4,466,284 | 8/1984 | Dumery ................... 73/313 |
| 4,589,282 | 5/1986 | Dumery ................... 73/313 |
| 4,627,283 | 12/1986 | Nishida ................... 73/313 |
| 4,796,472 | 1/1989 | Lew ....................... 73/313 |
| 4,976,146 | 12/1990 | Senghaas et al. .......... 73/DIG. 5 |
| 5,056,049 | 10/1991 | O'Neill ................... 340/623 |

FOREIGN PATENT DOCUMENTS

| | | |
|---|---|---|
| 0093188 | 11/1988 | European Pat. Off. . |
| 2212532 | 7/1974 | France . |
| 2314363 | 10/1974 | Germany . |
| 3510198 | 9/1986 | Germany . |
| 4011858 | 10/1990 | Germany . |
| 997861 | 7/1965 | United Kingdom . |
| 1011205 | 11/1965 | United Kingdom . |

*Primary Examiner*—Que T. Le

[57] ABSTRACT

Signal generating apparatus comprises a linear series of Hall-effect switches (44) arranged as a plurality of linear arrays in discrete probes (46a, 46b ... 46n) which are butted end to end. Each switch is closed when in proximity of an actuating magnet (40) moveable along the series of switches. In each array a resistance chain (66) is linked at intervals to the switches. Movement of the magnet along an array thereby gives a progressively changing voltage on an output line (50) from the resistance chain as a cumulative signal indicating the position of the magnet. When the magnet moves from one array to the succeeding array after generating a maximum cumulative signal from said one array, that signal is maintained by a latch connection (56) between the two arrays. A cumulative signal representing the magnet position relative to the complete series of switches can thus be generated. The arrays are powered in parallel so that it is possible to extend substantially the total number of switches or indicating points in the apparatus.

11 Claims, 10 Drawing Sheets

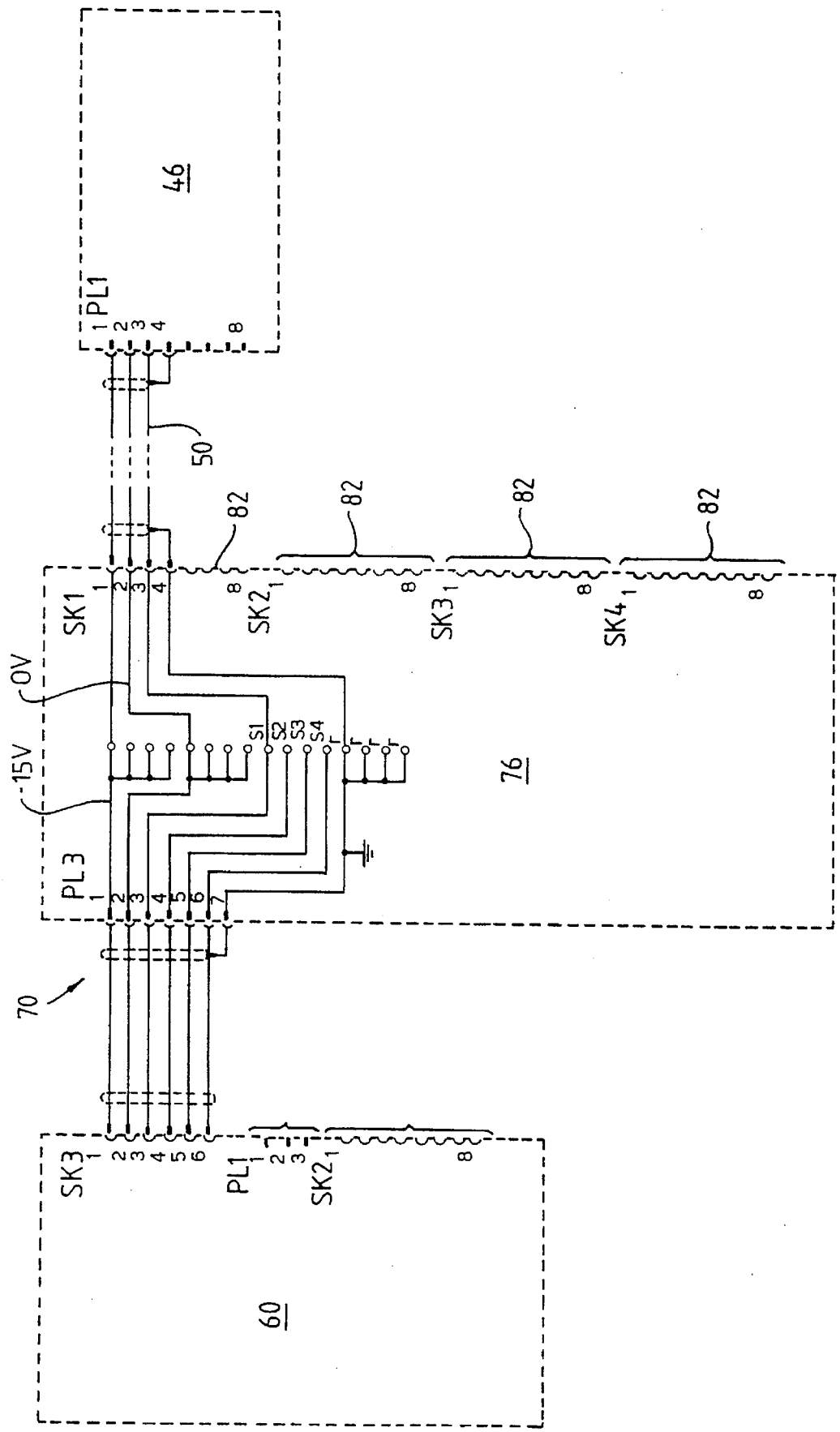

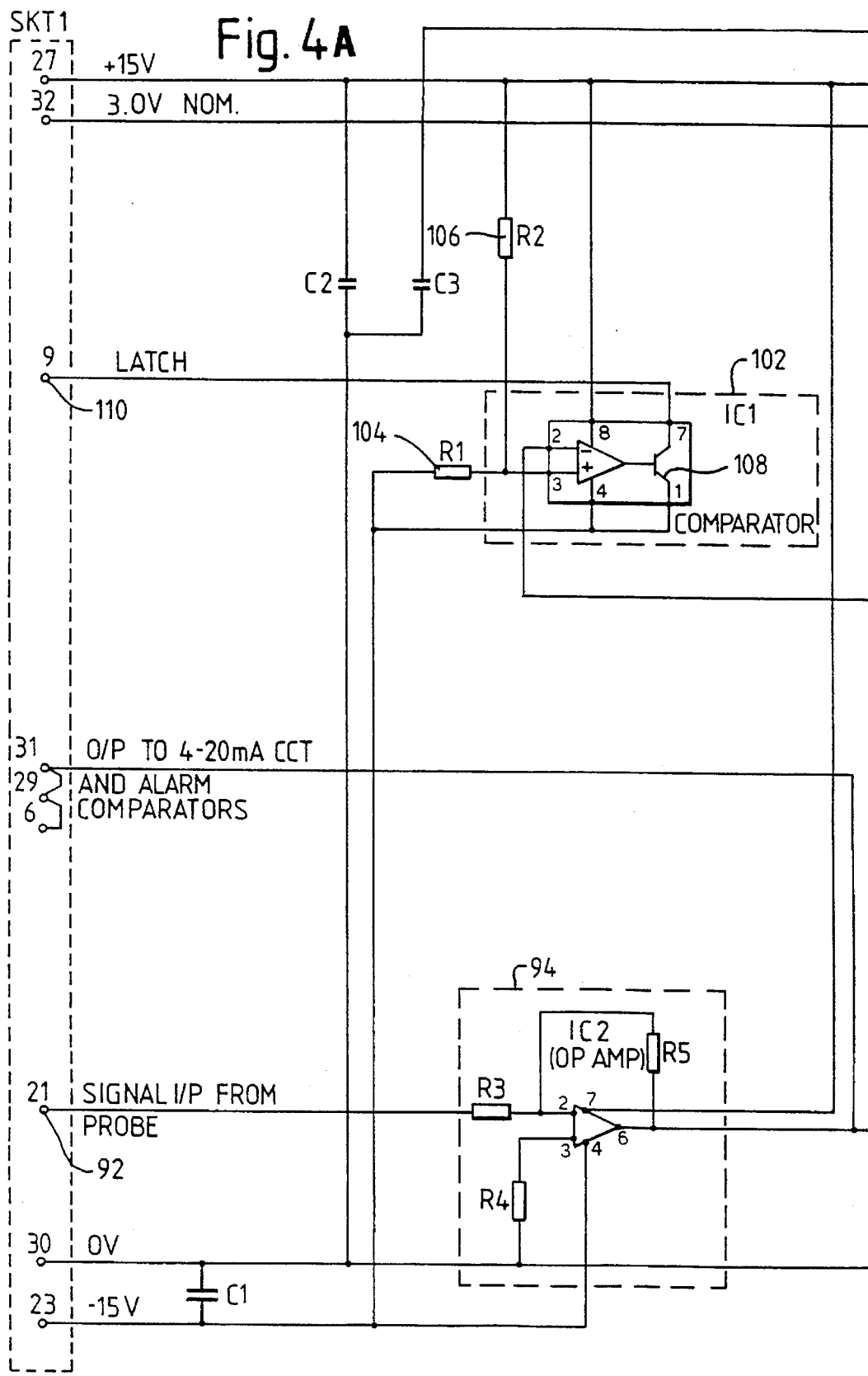

5,565,687

LIQUID LEVEL MONITOR HAVING A PLURALITY OF PROXIMITY SENSORS AND A SENSOR ACTUATING ELEMENT

FIELD OF THE INVENTION

This invention relates to signal generating apparatus, and in particular to position-responsive apparatus, for example for monitoring a liquid level, and to a method of deriving position-responsive signals, eg. in order to sense and display particular values and/or to control a variable determining those values.

1. Background of the Invention

There are many processes in which a directly contacting probe or the like cannot be employed to monitor changes of position, for example because of a hostile environment or the aggressive nature of the material being monitored. Non-contacting sensors must then be used, such as devices responsive to magnetic fields.

2. Description of the Prior Art

Non-contacting liquid level indicators have been described employing a vertical array of magnetic switches, as in the examples of GB 997861 and U.S. Pat. Nos. 4,627,283 and 4,589,282, in which a magnet carried by a float operates the switches without contacting them. Such switches have an on-off operation so that they provide stepped measurements, but that is not necessarily a disadvantage if the steps are sufficiently small. In the last-mentioned U.S. Pat. No. 4,589,282 in particular, there is proposed the use of Hall-effect switches, which provide relatively compact and convenient switching devices with a small power consumption.

These earlier proposals are limited in respect of range and/or accuracy of measurement, however. It will be understood, that the incremented signal change between successive steps must be sufficient to be unaffected by circuit noise so that it soon becomes inconvenient to cope with the increasing signal voltage range if it is required to have an indicator with a very large number of steps, whether for increased accuracy or for greater range of measurement. In the apparatus of U.S. Pat. No. 4,589,282 a vernier-like arrangement of switches and magnets is proposed to increase the accuracy of measurement but that requires complex circuitry which itself poses a practical limit to the maximum number of steps or graduations over the range of measurement.

SUMMARY OF THE INVENTION

According to one aspect of the present invention, there is provided position-responsive apparatus comprising a series of detecting elements disposed in succession alongside a path of relative movement with a non-contacting actuating means adapted to act on respective detecting elements by its proximity thereto along said path, and resistance means connected to the detecting elements to produce an output signal which is progressively changed with relative movement between the actuating means and the series of detecting elements over the length of said path of relative movement, the series of detecting elements being arranged in a plurality of arrays disposed in series to extend over different portions of said path of relative movement and means operable with the passage of the actuating means between successive arrays in a direction away from one end of said path for transmitting a cumulative output signal which includes a component corresponding to the output signal from each preceding array from said one end of the path of relative movement Such apparatus provides for the possibility of connecting a supply voltage to each said array of detecting elements independently of the other arrays, conveniently by connecting them in parallel to a common supply, so that the range of measurement can be extended indefinitely and/or the accuracy of measurement is limited only by the nature of the detecting elements themselves. Nevertheless, because the signal state for each lower array can be made dependent to the action of the actuating means on a succeeding array, cumulative signals can be generated from the arrays jointly. Thus, if a liquid-level indicating means comprises a vertically arranged series of said detecting elements, when the actuating means rises above a first or lowest array of said detecting elements, the output signal indicating it had risen the height of that first array is maintained and is added to the height position signal that is generated from the succeeding array above the first array.

In a preferred arrangement, the actuating means has a switching influence over a path length greater than the pitch of succeeding detecting elements whereby each detecting element is switched by the actuating means element before the immediately preceding element is released from its switched state. In relative movement from one array to the succeeding array away from said one end of the path, therefore, a momentary retention of the signal from said one array can be employed to establish a signal indicating the passage of the actuating means over the length of said one array. If that signal is held while the position of the actuating means remains above said one array, a cumulative signal can be built up although the signals from the respective arrays may be independent of each other.

Preferably, for said holding of the signal each succeeding array is connected to latch means which are operative to latch on a 100% signal of a preceding array when the actuating means switches on the first or lowest element of the succeeding array.

It is also possible to associate each array of detecting elements with a respective cumulative indicating means and to provide means for the cumulative operation of the indicating means of all the arrays. Conveniently interconnecting means between the indicating means of successive arrays are arranged to hold said indicating means of a preceding array in a 100% cumulative state when there is relative movement of the actuating means in the direction away from said one end of the path to a following array, whereby the indicating means of the respective arrays are cumulatively operative with relative movement of the actuating means in said direction.

According to another aspect of the invention, there is provided a method of indicating the position of an actuating member relatively movable to a succession of detecting elements along the path of said relative movement, said actuating member acting on respective detecting elements by its proximity thereto, in which the detecting elements are grouped in a plurality arrays in series along said path, and an output signal is generated from each said array by the proximity of the actuating member thereto, independently of the other array or arrays, and for the or each said array from one end of said path preceding an array adjacent to which the actuating member is located at any instant, a signal is generated corresponding to the signal obtained when the actuating member is at the end of the respective array remote from said one end of the path, and the or each said signal is evaluated cumulatively with the signal from said array adjacent the actuating member for said indication of the actuating member position along said path.

In a further aspect of the invention there is provided a signal generating apparatus comprising means for inputting a plurality of variable input signals to produce a cumulative output signal and means for selectively varying the number of said inputs, impedance-changing means in the paths of the respective input signals for providing a substantially constant impedance for the cumulative output signal independent of the number of said inputs. Although such means may also have other applications, they can be employed advantageously for forming a cumulative signal from the signals of the respective arrays, so that the position indicating apparatus can be operated with a greater or lesser number of said arrays without modification of evaluation means for the cumulative signal.

BRIEF DESCRIPTION OF THE DRAWINGS

By way of example, the invention will now be described with reference to the accompanying drawings, in which:

FIG. 3 is a circuit diagram of a splitter circuit for powering the arrays of FIG. 1, FIGS. 4A and 4B are circuit diagrams of a signal processing circuit for the array of FIG. 2, FIGS. 5A, 5B, 5C, and 5D are circuit diagrams of a control circuit in which the signal processing circuits of FIGS. 4A and 4B are deployed.

DETAILED DESCRIPTION OF THE INVENTION

Figure 1:
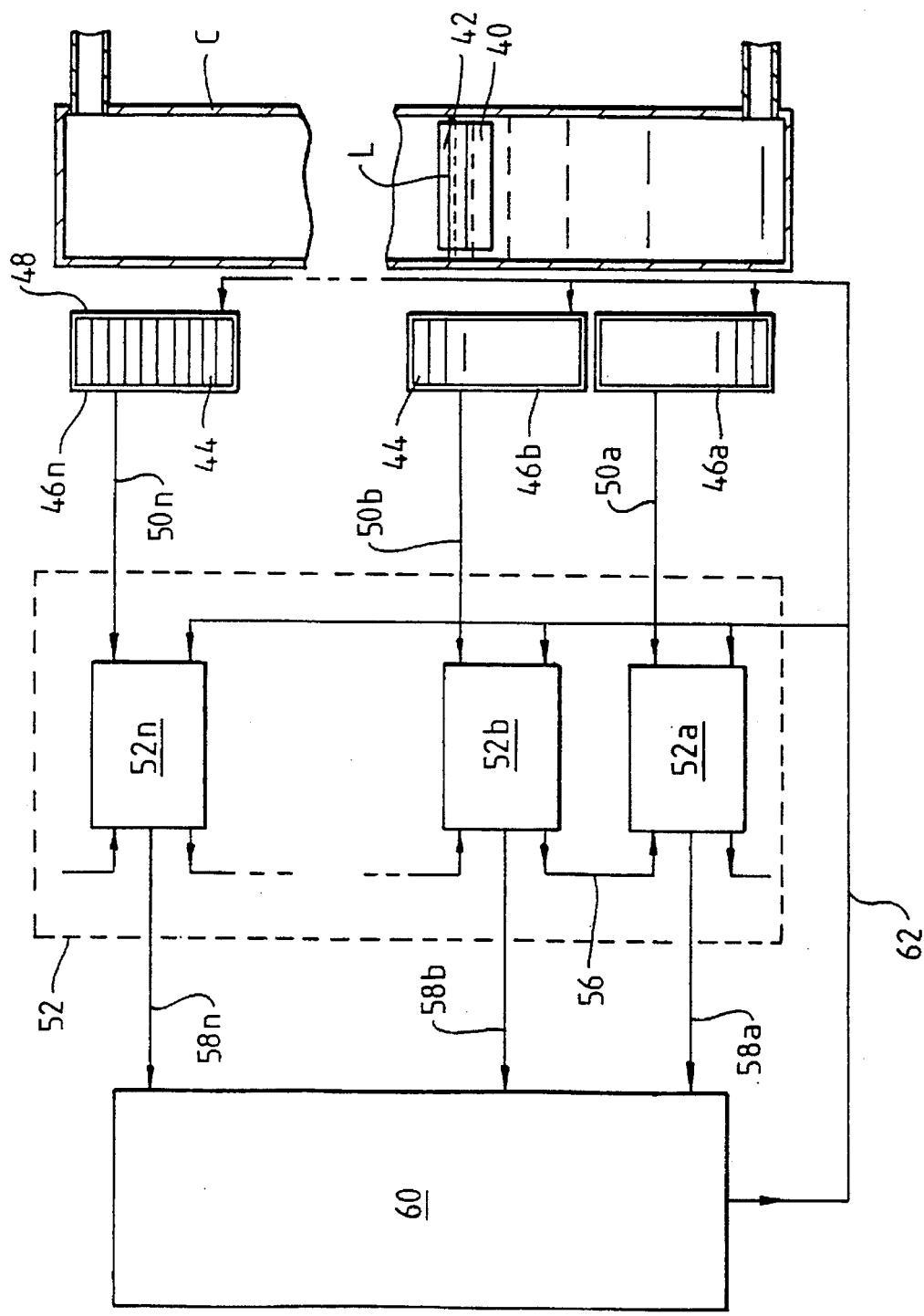
FIG. 1 is a block diagram of one form of apparatus according to the invention.

Referring to FIG. 1, the system shown is intended for sensing the liquid level L in a column or stand pipe C. A magnet 40 mounted on a float 42 in the column moves up and down with the change of the liquid level and can act on a vertical series of sensors 44 disposed at equal height intervals adjacent and parallel to the column C. The sensors are contained in a series of discrete elongate probes 46, a–n identical to each other and arranged end to end to extend over the required height of the column. Each probe contains a series array of individual sensors encapsulated in an outer casing 48 of non-magnetic material.

The respective probes are indicated in ascending order by the references 46a,46b. . . 46n. Output signal lines 50a,50b. . . 50n connect the probes to respective signal processing units 52a, 52b. . . 52n in a corresponding series of signal processing units 52. To serve as an array signal latching means, latching connections 56 are provided between successive pairs of signal processing units 52. Output lines 58a, 58b. . . 58n from the signal processing units 52a, 52b. . . 52n input to a control unit 60 for the generation of control signals and/or alarm signals as required. The control unit 60 also comprises power supply means, further described below, to which the individual probes 46 and signal processing units 52 are connected in respective parallel groups by conductors indicated generally in FIG. 1 by the reference 62. As will become clear later in this description, it is possible to operate the apparatus with less than the maximum number of probes if desired.

Figure 2:
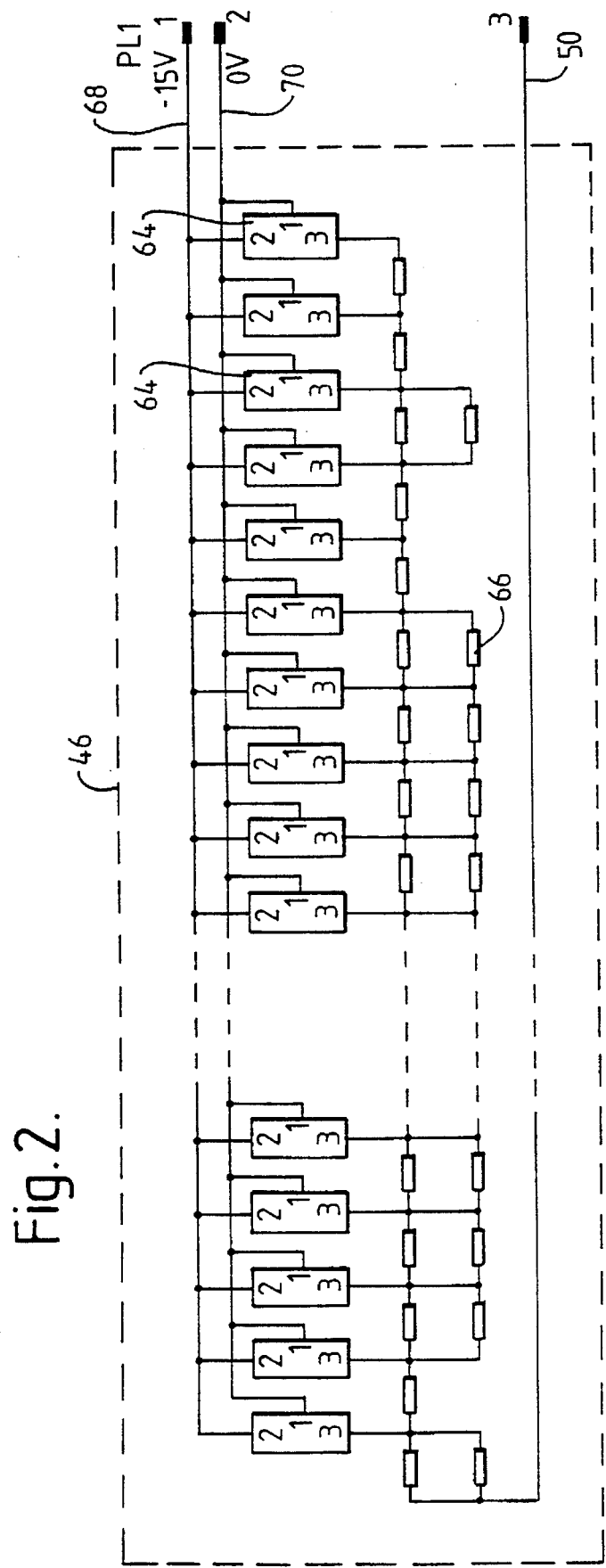
FIG. 2 is a circuit diagram of an array of position-detecting elements for the apparatus of FIG. 1.

FIG. 2 illustrates the circuit of a probe 46 in more detail. Along its length are arranged a series of Hall-effect switches 64 (eg. UGS3140U switches supplied by Allegro Microsystems Inc of Worcester, Mass.) which are comprised in the sensors 44, and a series chain of resistors 66. The switches 64 are connected in parallel across −15 V and 0 V lines 68,70 of the conductors 62. Each switch also has an output terminal connected to the chain of resistors 66, the successive connections being made to successive stages in the chain. The output signal line 50 is connected to the end of the resistor chain at the top of the probe.

The switches 64 are normally in an off state but each is closed when the magnet 40 is in proximity to it. If the magnet is below the height of the probe, therefore, all the switches will be off and no signal appears on the output line 50. When the magnet closes the lowermost switch, the −15 V supply line 68 is connected to the output line 50 through the chain of resistors 66. As the magnet moves upwards successive ones of the switches 64 are closed. A decreasing portion of the resistance chain remains in circuit with the supply voltage and an increasing voltage signal is thus obtained on the line 50. Each output line 50 connects to ground through a respective shunt resistance 72a, 72b. . . 72n (FIG. 5) in the control unit. The value of the shunt resistances can be varied over a limited range to compensate for variations in conductor resistance between the probe and the control unit. The value of the shunt resistance is set to give a maximum probe signal output of −5.5 volts and the resistance steps between each switch of a probe are selected to give an equal change in the shunt resistor current for each step. It is therefore convenient to form some of the steps from parallel resistors, as shown. The arrangement is such that as the magnet rises and falls, it will switch on a succeeding switch before it allows the preceding switch to open.

The switches 64 are grouped closely in the probe, for example at 20 mm intervals so that a fifty-switch probe monitors a height of one meter. The overall length of the probes is controlled to allow them to be butted together with their adjacent end switches positioned at the same 20 mm interval.

The connections between the probes 46 and the processing and control units 52,60 are conveniently made through a splitter unit 76 (FIG. 3) disposed adjacent the probes 46. The splitter unit 76 has a plug connector 70 for a connection from the control unit 60 comprising heavy cable conductors for main power −15 V and 0 V lines. These conductors are coupled in the unit 76 to each of four sockets 82 for respective plug and socket connections to the individual probes. Each of the sockets 82 also provides a connection for the output signal line 50 of its probe to further conductors in the connector 80 to input the probe signals to respective terminals 84a, 84b. . . 84n (FIG. 5a) of the socket connection on the control unit for the connector 80. The use of the splitter unit is able to avoid any excessive voltage drop in the power supply to the probes while allowing a relatively compact form of plug and socket connection at the probes themselves.

Figure 4B:
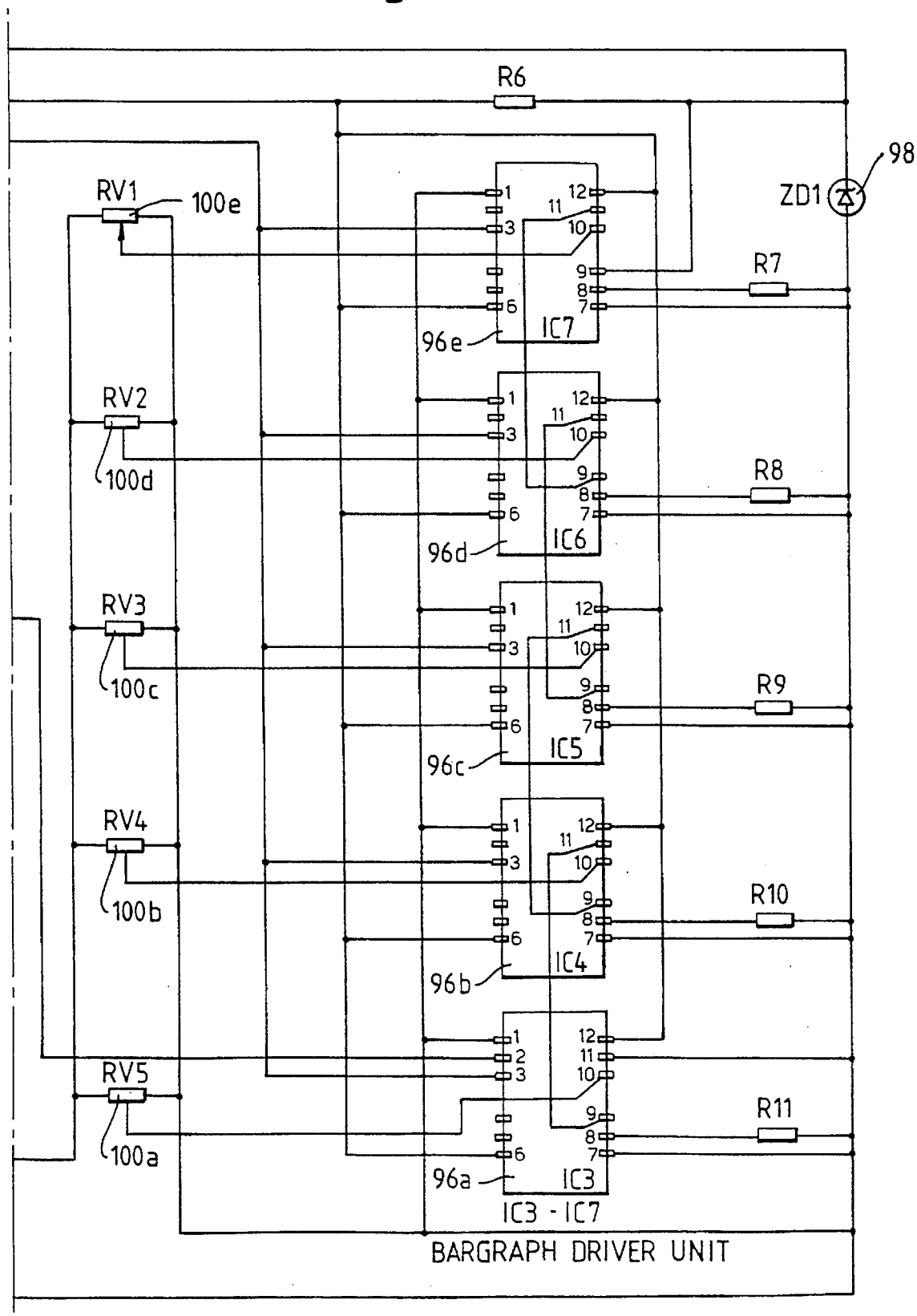
Figure 6:
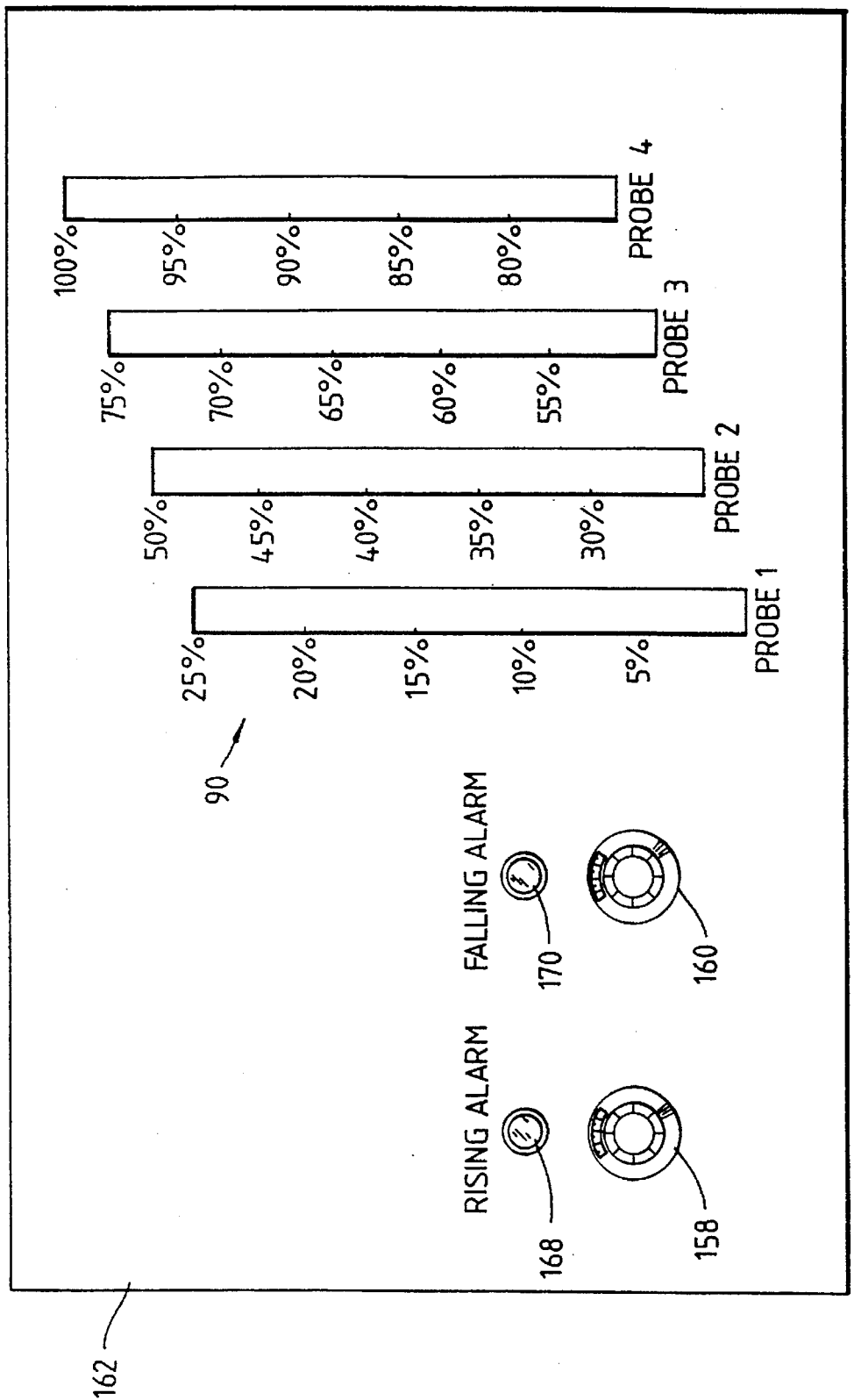
FIG. 6 illustrates the display panel of the apparatus of the preceding figures.

The signal processing units 52a, 52b. . . 52n are a series of identical printed circuit cards, illustrated in more detail in FIG. 4, which are simply plugged into the control unit which takes the form of a motherboard. Each plug has main power connections from +15 V, −15 V and 0 V lines and also a nominal 3.0 V supply connection for driving an LED display 90 (FIG. 6). The probe output signal on line 50 is fed through a further input terminal 92 of the signal processing unit to a DC inverter 94 which transforms the probe signal to a positive voltage for operating a series of five display driver units in the form of integrated circuits 96a... 96e associated with the LED decade displays 90 shown in FIG. 6.

Each display driver circuit 96 has reference connection pins 9 and 11. Pin 11 of the first circuit 96a of the series (ie. that for the first or lowermost decade of the display) is connected to the 0 V line and its pin 9 is connected to pin 11 of the next higher circuit. This pattern of connection is continued through the circuits until, in the uppermost circuit, the connection pin 9 is connected to an accurate reference voltage provided by a voltage reference IC 98. With a reference voltage of 5 V set by the diode 98, each driver circuit 96 therefore has a reference range of substantially 1 V.

The output signal from the inverter 94 reaches the display driver circuits through respective potentiometers 100a... 100e. As already mentioned, the maximum probe voltage is 5.5 V whereas the maximum signal required for the five driver units is 5 V and the potentiometers are trimmed to give a 1 V signal range for each driver circuit. In this way it is possible to compensate for variations in the resistance values in the LED driver units and ensure that an inverter output signal of 1.1 V actuates the ten readout digits of the first decade, a 2.2 V output also actuates the further ten readout digits of the second decade, and so on.

Figure 5A:
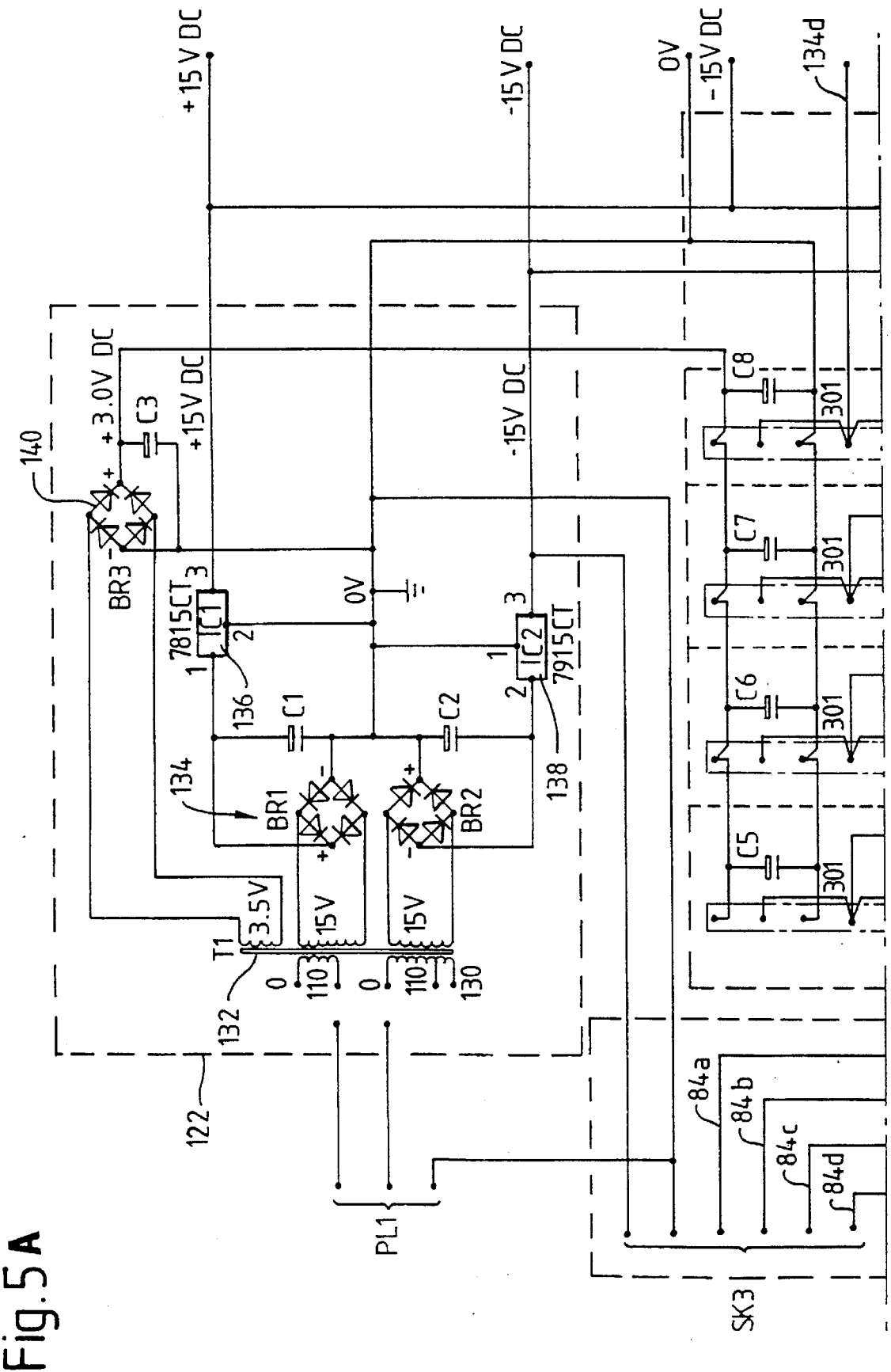
Figure 5B:
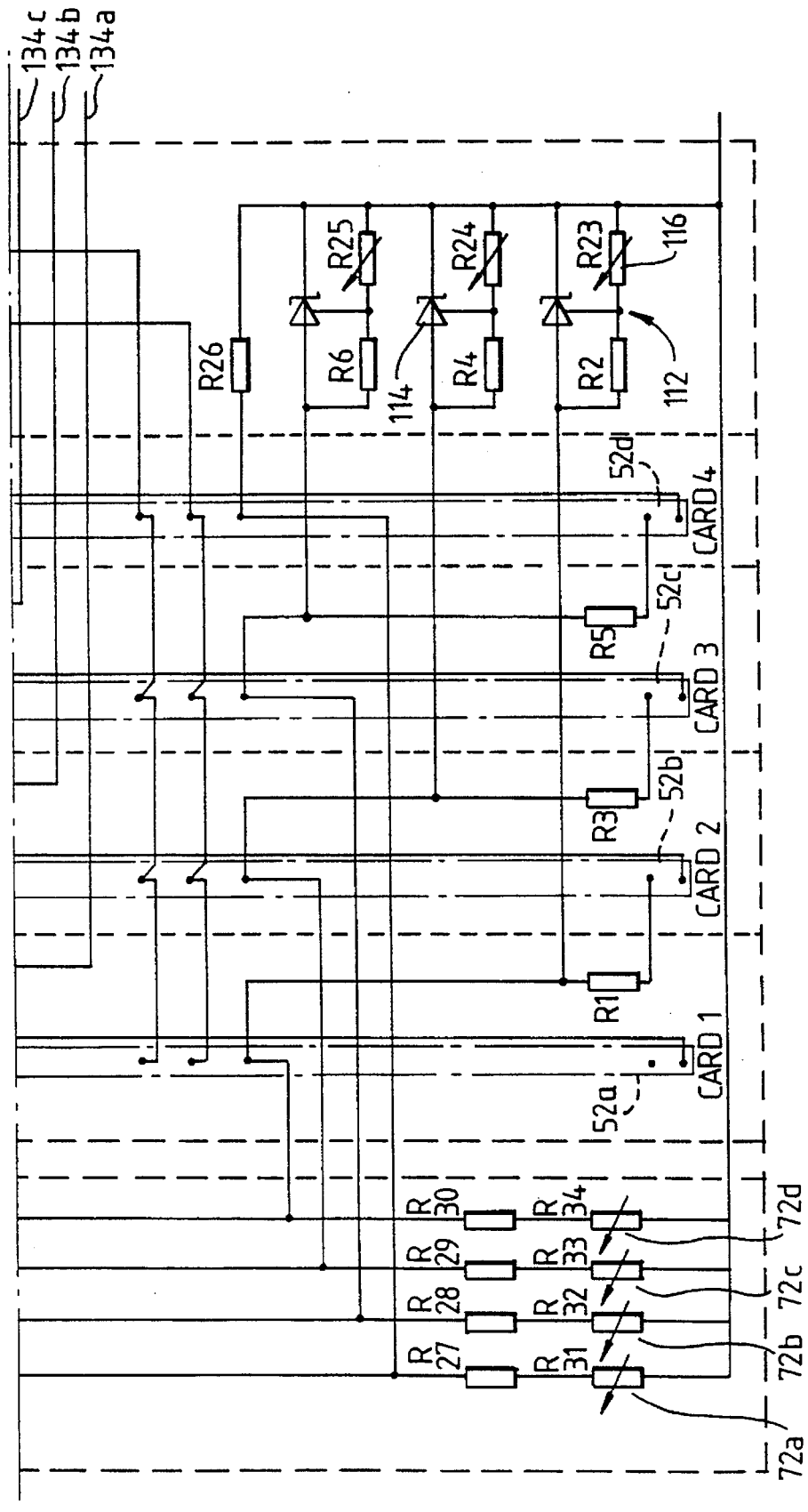
Figure 5C:
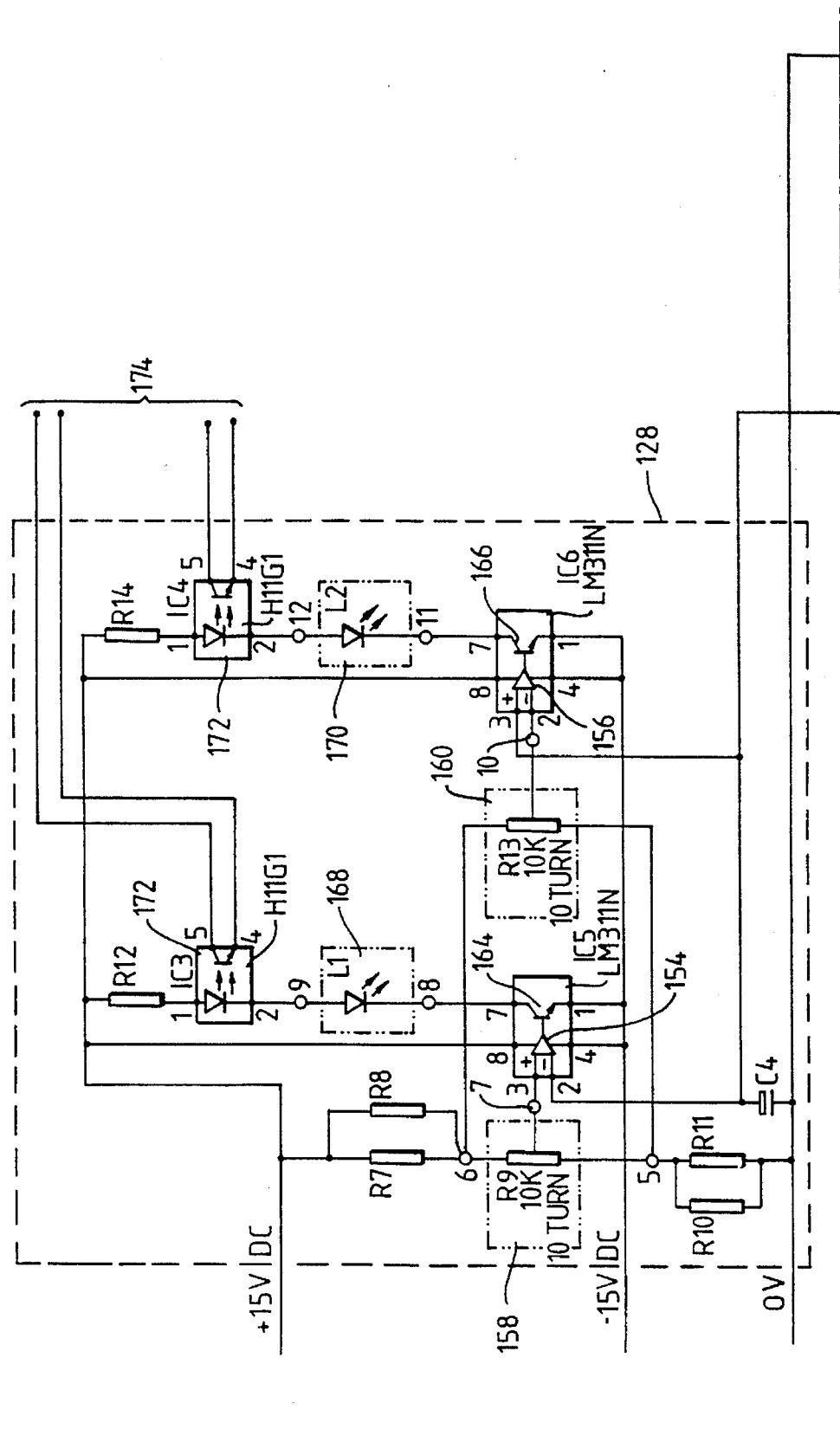
Figure 5D:
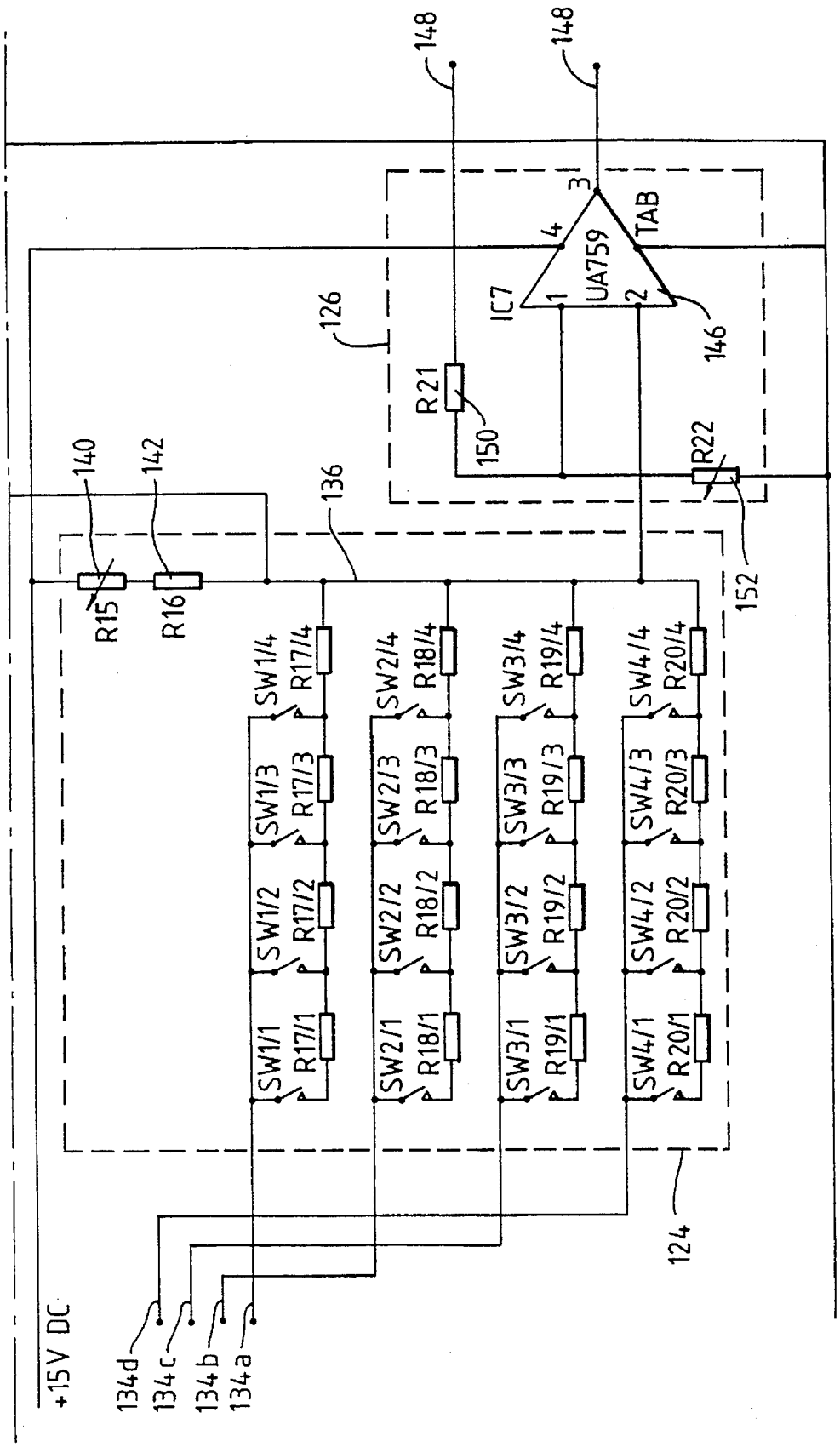

The signal processing unit also includes a latch 102 comprising a comparator having first input at a constant voltage determined by divider resistors 104,106 connected between the +15 V and −15 V supply terminals. A second input comes from pin 2 on the first driver circuit 96a. The first 0.1 V increment to the driver circuits, ie. the actuation of the lowermost switch of the probe array by the magnet 40 switches the pin 2 of the first driver circuit 96a low to below the nominal 3 V voltage applied to pin 3 of that circuit as a reference voltage. Base of transistor 108 of the latch is thereby switched low and the −15 V line is connected through output terminal 110 to the latching connection 56 indicated in FIG. 1. More specifically, the output from the terminal 110 goes through a respective voltage limiting circuit 112 in the control unit (see FIG. 5a), each said circuit comprising a voltage reference IC 114 and trimmable resistance 116 to set a maximum −5.5 V voltage (100% probe reading) for the signal through the latch connection 56 to the probe input terminal of the preceding signal processing unit. FIG. 5a only shows three resistor-potentiometer pairs, of course, because there is no latching input connection to the signal processing unit for the uppermost probe.

By linking the operation of the respective signal processing units by the latches 102, as the float rises from the region of one probe to a succeeding higher probe the latch of the signal processing unit of the latter inputs a voltage signal corresponding to the 100% output reading from the lower probe after the magnet has moved above it. A cumulative output signal is thereby generated despite the fact that the independently operating lower probe is no longer actuated by the magnet.

As already mentioned, the switches 64 of the probes operate in an overlapping manner with each succeeding switch closing before the preceding switch breaks. This means that as the magnet rises past the junction between two probes, while the uppermost switch of the lower probe is still closed, the lowermost switch of the upper probe is made. The display of the lower circuit is therefore kept fully activated at least as long as is needed to close the lowermost switch of the upper probe and so close the latch. Conversely, when the magnet falls, the latch is opened only after the uppermost switch of the lower probe has been actuated. Drop out is thus avoided in either direction of movement.

It will be apparent that as the float rises past the junction between two probes and the latch is made, that new source is a second current input because the uppermost switch of the lower probe has not yet opened. The voltage limiting circuit 112 avoids disturbances from this source by limiting the voltage to the 100% probe reading of −5.5 V.

On the motherboard forming the control unit 60, in addition to those components already identified are a power supply circuit 122, a signal division matrix 124, a current generating circuit 126 for an external circuit (not shown), and an alarm generating circuit 128.

The power supply circuit 122 comprises transformer and rectifying units 132,134 producing DC ±15 V outputs controlled by voltage regulators 136,138 for the main operating functions, and a further rectifying unit 140 tapping the transformer unit 132 for an unregulated 3 V DC supply for the LED displays.

The signal division matrix 124 is provided to ensure that the signal to the current generating and alarm circuits 126,128 is independent of the number of probes employed, within the capacity of the apparatus. It comprises a series of parallel gangs of corresponding resistances, in this instance four gangs each of four resistances because there are four signal processing units 52. The resistance value chosen for each resistance in this example is 4.7 k ohms. Switches SW1/1 to SW4/4, which may take the form of 4-pole DIL switches, in the matrix allow the resistances of each gang to be brought into circuit to provide a variable impedance between the respective signal output lines 134a... 134d of the associated signal processing units, and a common output line 136. The cumulative output signals from the matrix therefore give a rising positive voltage on line 136 as the probe signals increase.

It has already been mentioned that the apparatus will function if fewer than the full number of probes are used. If in a particular installation one probe and its signal processing unit is fitted, for example the first probe 46a and unit 52a giving a signal output on line 134a, only the switch SW1/4 is closed. Because the other signal output lines are open-circuited there is therefore an impedance of 4.7 k ohm placed on the common line 136 by the single resistance SW1/4. If there are two probes 46a, 46b in use and the lines 134a and 134b are both connected to their respective signal processing units 52a, 52b switches SW1/3 and SW2/3 are closed, giving 2×4.7 k ohms resistances in circuit in each of two parallel lines, ie. a resultant impedance again of 4.7 k ohms. In a similar manner, the impedance is to be kept the same if a greater number of probes are employed.

The signal division matrix 124 also allows the range of operation to be compressed to a part of the maximum range. If, for example, switch SW3/4 only is closed, it provides the only current path through the matrix, ie. the matrix only passes signals processed from the associated third probe. The current output range for the signal and alarm circuits 126,128 otherwise available for the signals from all four probes is now restricted to the travel length of the one probe.

The common output line 136 for the signal division matrix contains a series potentiometer 140 and fixed resistance 142 which form a dropper chain with the selected matrix resistances between the +15 V and 0 V lines. Taps from the dropper chain between the matrix resistances and the pair 140,142 provide an input voltage to pin 2 of comparator 146 of the current generator circuit 126 and to the alarm circuit 128.

The positive voltage on line 136 is applied to pin 2 of the comparator and causes the comparator output to attempt to rise. If instrumentation or another external current loop (not shown) is connected to the terminals 148 of the output circuit, that rising effect will try to balance the input on pin 1 of the comparator with that on pin 2. Current will then flow through the line containing the resistance 150 and potentiometer 152 until the voltages at the pins 1 and 2 are balanced. The current flow in the external loop is thus dependent upon the signal output voltage applied to pin 2. The current range can be chosen by adjustments of the potentiometers 140 and 152. In this example, over the matrix output range of 0 V to +5.5 V the current range may be set at 4 mA to 20 mA.

The connection from the line 136 to the alarm circuit 128 carries the same signal output voltage as that applied to the comparator 146. The alarm circuit comprises two comparators 154 and 156 which are fed with the signal voltage in inverse sense to each other to provide rising and falling alarm indications respectively. The other input to each comparator is a reference voltage set by respective 10-turn potentiometers 158,160 (FIG. 6) on the display panel 162 of the apparatus. The potentiometers can be manually adjusted between 0 and 100% levels for independent adjustment of either alarm level.

Each comparator 154,156 is connected to an output transistor 164,166 respectively which switches low when the selected reference voltage of its comparator is passed, in one case on a rising signal and in the other on a falling signal. This brings into operation a respective high or low alarm LED 168,170 on the display panel, and also an associated opto-coupler 172 in series therewith. The opto-couplers output through external plug connectors 174 for remote alarm indication.

Although the invention has been illustrated by its application to a liquid level indicator it will be understood that it is capable of being employed for other kinds of position indication, including rotary position. It will also be understood that the signal matrix circuit is applicable more widely than in the illustrated example, to assist the coupling of a plurality of input signals of any parameter to a common output line giving a cumulative signal value for operational purposes.

I claim:

1. Position responsive apparatus including:
   (a) a plurality of arrays of proximity sensors with said arrays arranged successively in series and with each array including a plurality of sensors, each array having a sensor output line;
   (b) for each array of proximity sensors,
      (i) an array of resistance elements, the sensor output lines being connected to the array of resistance elements at positions in said array of resistance elements dependent upon the positions of the sensors in said respective array of proximity sensors,
      (ii) each said array of resistance elements having an end, an array output line at said end of each said array of resistance elements, and
      (iii) a signal processor connected to each said array output line;
   (c) sensor actuating means traversable along the said arrays of proximity sensors without contact therewith, whereby in operation when the sensor actuating means is in proximity to a proximity sensor, the array of proximity sensors outputs a sensor signal on the sensor output line, which sensor signal after passing through the array of resistance elements becomes an array signal on the array output line, traversing of the sensor actuating means along the array from one end to the opposite end of a said array of sensors thereby changing the magnitude of the array signal from a minimum to a maximum signal in accordance with the position of the sensor actuating means; and
   (d) array signal latching means for passing array signals between successive arrays of sensors such that when the sensor actuating means traverses from any one of the arrays to a succeeding array after generating a maximum signal from said one array, the array signal latching means passes the maximum signal to the signal processor of the succeeding array, the signal processor having means for summing the maximum signal with the array signal from the succeeding array, thereby to generate a cumulative signal representing the sensor actuating means position relative to said plurality of arrays of proximity sensors.

2. Position responsive apparatus according to claim 1, in which the arrays of proximity sensors and signal processing means are connected to power supply means in respective parallel groups, whereby it is possible readily to change the measurement range of the apparatus by changing the number of arrays of proximity sensors.

3. Position responsive apparatus according to claim 1 or claim 2, in which the actuating means has an actuating influence over a path length greater than the distance between succeeding sensors, whereby each sensor is actuated by the actuating means before the immediately preceding sensor is released from its actuated state.

4. Position responsive apparatus according to claims 1 or 2, including a plurality of parallel electrical paths for inputting array signals from the respective array output lines to a common output line to produce a cumulative signal therefrom, and variable impedance means in said parallel paths for providing a substantially constant impedance for the common output line independent of the number of input signals.

5. Position responsive apparatus according to claim 4, in which said variable impedance means comprises a plurality of resistances in parallel, each resistance being in series with a respective input signal and all the resistances being connected to a common output for the cumulative signal, means for open circuiting the resistances to which no inputs are to be applied, and means varying the resistances in those lines to which the inputs are to be applied in dependence upon the number of said inputs.

6. Position responsive apparatus according to claim 5, wherein each parallel resistance line comprises a series of similar value resistors, the total number of which in each line corresponds to a maximum number of said input signals.

7. Position responsive apparatus according to claims 1 or 2, in which each array of sensors is connected to a common line and successive members of the array of resistance elements connect the sensor output lines of successive neighbouring sensors, whereby the resistance between said array of resistance elements and the common line is dependent upon the sensor or sensors acted upon by the actuating means, the array signals being voltage signals whose magnitude is dependant on the resistance between said array of resistance elements and the common line.

8. Position responsive apparatus according to claim 7, in which the resistance elements provide substantially equal voltage signal steps from the actuation of successive sensors.

9. Apparatus according to claims 1 or 2 wherein the sensors are Hall-effect devices.

10. A method of indicating the position of an actuating member traversable along a series of sensors, said actuating member acting on respective sensors by its proximity thereto, the sensors being grouped in a plurality of arrays in series, the method comprising the steps of:

(a) generating an active array output signal from an array at least one sensor of which is actuated by proximity of the actuating member thereto, the active array output signal being indicative of position of the actuating member with respect to the sensors in the array, (b) generating a traversed array output signal from all other arrays which the actuating member has traversed before the active array output signal was generated, the traversed array output signals corresponding to the active array output signal obtained when the actuating member is at the end of an array before traversing to the succeeding array, and (c) summing the traversed and active array output signals for said indication of the actuating member position along said series of sensors.

11. A method according to claim 10, comprising the further step of changing the measurement range of the apparatus by changing the number of sensor arrays, this being facilitated by connecting the sensor arrays and signal processing means to power supply means in respective parallel groups.

* * * * *